United States Patent [19]

Dehn

[11] 4,237,731
[45] Dec. 9, 1980

[54] TEMPERATURE SENSING PROBE FOR MICROWAVE OVENS

[75] Inventor: Rudolph A. Dehn, Schenectady, N.Y.

[73] Assignee: General Electric Company, Schenectady, N.Y.

[21] Appl. No.: 28,180

[22] Filed: Apr. 9, 1979

[51] Int. Cl.³ .................. G01K 07/16; H05B 06/80
[52] U.S. Cl. .......................... 73/352; 219/10.53 B
[58] Field of Search .................. 73/352; 324/95, 64; 219/10.55 B, 10.55 E, 10.55 R, 10.55 F

[56] References Cited

U.S. PATENT DOCUMENTS

| | | | |
|---|---|---|---|
| 2,540,036 | 1/1951 | Spencer | 99/221 |
| 2,657,580 | 11/1953 | Schroeder | 73/352 X |
| 3,721,900 | 3/1973 | Andrews | 324/95 |
| 3,794,914 | 2/1974 | Ashlan | 324/95 |
| 3,896,373 | 7/1975 | Zelby | 324/64 X |
| 3,974,696 | 8/1976 | Fitzmayer | 73/352 |
| 4,009,359 | 2/1977 | Tallmadge et al. | 324/95 |
| 4,023,093 | 5/1977 | Ashlan | 324/95 X |
| 4,035,787 | 7/1977 | Hornung | 219/10.55 B X |
| 4,081,645 | 3/1978 | Jares et al. | 219/10.55 B |
| 4,086,813 | 5/1978 | Meek et al. | 73/352 |

OTHER PUBLICATIONS

Publication: "Electrical Measurement in Theory and Application", A. W. Smith, PhD., 4th Edition., McGraw Hill Book Co., 1948, (pp. 119, 152).
Publ. "Development of Electric & Magnetic Near-Field Probe", by Frank M. Greene, Dept. of Commerce 1/1975. pp. 6-8, 38-44.

*Primary Examiner*—Daniel W. Yasich
*Attorney, Agent, or Firm*—Donald R. Campbell; Marvin Snyder; Davis James C.

[57] ABSTRACT

A high impedance four wire temperature sensing system is comprised of a thermistor or other sensor and four leads such that a constant current is impressed on the sensor via two leads and the voltage across the sensor is read via the other two. The sensor and leads have microwave surface resistivity much higher than impedance levels in microwave ovens so that negligible microwave energy is coupled to the sensing system. The high resistance leads in a rigid probe to be inserted into the food and in a flexible cable are electrically conductive iron oxide magnetic tape or are deposited conductors.

3 Claims, 7 Drawing Figures

U.S. Patent  Dec. 9, 1980  4,237,731
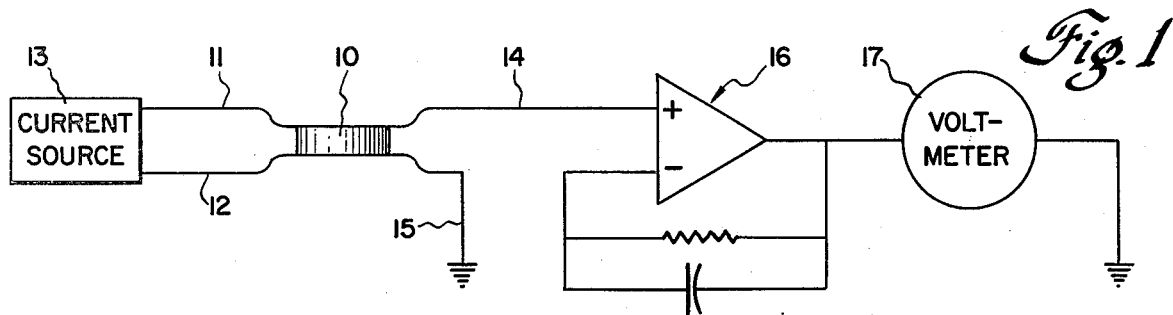
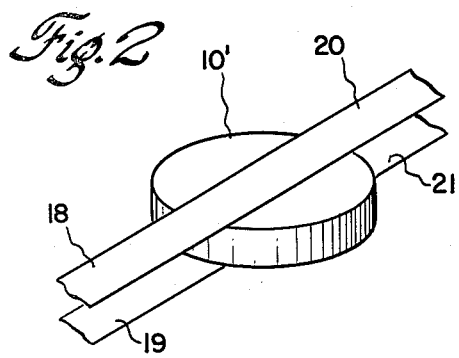
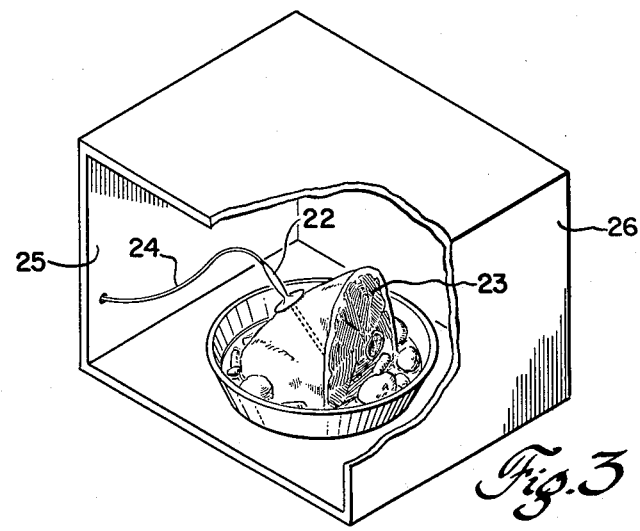
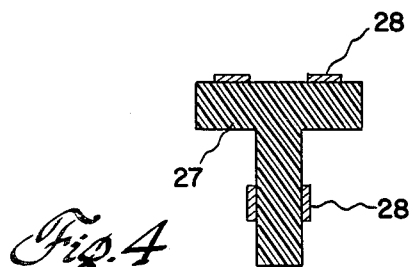
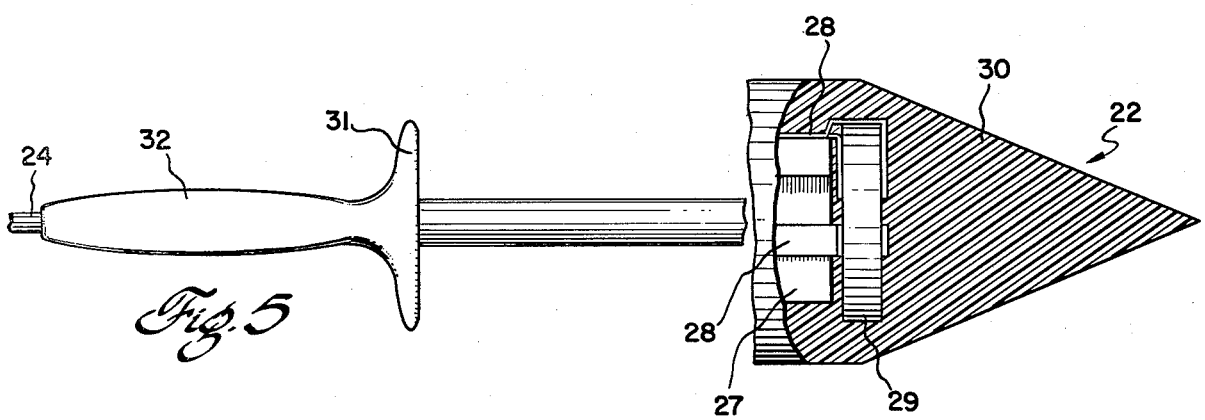
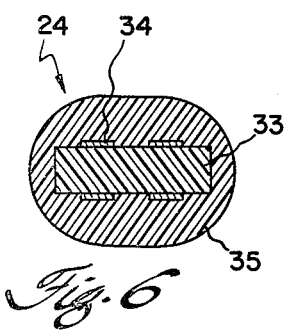

TEMPERATURE SENSING PROBE FOR MICROWAVE OVENS

RELATED APPLICATION

This application is related to Ser. No. 28,179, C. L. Andrews and L. H. Belden, Jr., "Magnetic Tape Leads for Probes in Electromagnetic Radiation", assigned to the assignee of this invention.

BACKGROUND OF THE INVENTION

This invention concerns an improved system for measuring the temperature of food loads being cooked in a microwave oven.

Metal probes that are inserted directly into the food as it cooks are commonly employed to measure its temperature; these probes have a metal sheath and flexible coaxial cable leads. One problem with metal probes is sparking, which can leave a carbon deposit on the food where it plugs in; if the probe is left on the floor of an empty oven with the power on, there can be a great deal of sparking. Another problem is that the metal sheath concentrates the microwave field in its vicinity and causes local heating. There is an error in the reading even though the local heat diffuses into the food.

Electric probes which are uniquely electric and magnetic probes which are uniquely magnetic are described in concurrently filed application Ser. No. 28,179, and are constructed with leads of electrically conductive iron oxide magnetic tape having a high resistance per unit length that are transparent to electromagnetic fields. Electric potential differences are conveyed to electrometers or control devices with minimal perturbation of the waves and without altering the elemental electric and magnetic probes.

SUMMARY OF THE INVENTION

An improved system for measuring the temperature of food in a microwave oven utilizes a high impedance sensor formed of a temperature sensitive resistive material, a first pair of high resistance leads connected across the sensor to impress a constant current such that a voltage is developed indicative of temperature, and a second pair of high resistance leads connected across the sensor to transmit the voltage to a high input impedance amplifier and voltmeter or other utilization circuitry. The sensor and leads have a sufficiently high impedance (by a factor of about 10:1 compared to the impedance levels in a microwave oven) that negligible microwave energy is coupled to the sensing system and the electromagnetic fields are minimally perturbed. The lead resistance is on the order of $10^5$ to $10^7$ ohms per meter, and the sensor is preferably a negative temperature coefficient thermistor with a resistance on the order of 10,000 to 20,000 ohms at 25° C. The leads are thin film conductors or are deposited conductors on an insulating substrate, such as tin oxide on polyimide; alternatively the leads are electrically conductive iron oxide magnetic tape having a coating of $\gamma$-$Fe_2O_3$ particles on a polyester substrate.

A temperature sensing probe according to the preferred embodiment has a rigid insulating bar with a thermistor mounted at one end and four leads deposited along the length of the bar that are connected to leads in a flexible cable. A dielectric, nonmetallic coating encapsulates the sensor and bar and also the flexible leads and is made of a material that is nonabsorbing to microwave energy. More accurate temperature readings are possible with the improved nonperturbing probe. The flexible cable can be passed through a hole in the metallic oven liner, and there is no leakage of energy to the ambient.

BRIEF DESCRIPTION OF THE DRAWING

FIG. 1 is a schematic circuit diagram of a high impedance four wire temperature sensing system;

FIG. 2 is a perspective view of a thermistor with magnetic tape leads;

FIG. 3 is a partial perspective of a microwave oven and the temperature sensing probe inserted into food being heated;

FIG. 4 is a cross section of the preferred embodiment of the high resistance leads on a rigid substrate;

FIG. 5 is a partial cross section and side view of a temperature probe with the substrate and leads of FIG. 4;

FIG. 6 is a cross section of the flexible cable in FIG. 5; and

FIG. 7 is a partial cross section of a modification of the temperature probe.

DESCRIPTION OF THE PREFERRED EMBODIMENTS

When a material having unit surface impedance much greater than that existent in a given electromagnetic wave system is inserted into such a field, essentially no electromagnetic energy will be coupled to the insert. By forming wires or ribbons of this material, these can be used as leads to bring dc or low frequency signals into and out of the microwave field without significant conduction of microwave energy to the ambient. In addition, a thermal sensor may be incorporated with the leads provided the temperature sensitive resistive material also has a high impedance. The impedance requirement depends on the wave impedance in the microwave field where these elements are located; more particularly, the integral of the system impedance along the length of the leads must be small, by a factor of about 10:1, compared to the impedance of the leads. The Q of a microwave oven with even a minimal load is low enough that the required probe impedance is managable. In a resonator with high Q, impedance at voltage maxima can be tens of thousands of ohms, and in this case the impedances required for the probe would be so high that other circuit problems would come in, one problem being that the voltage required of the current source would become excessive.

A high impedance temperature sensing system in FIG. 1 is a four wire system with a read-out amplifier having a high input impedance, so that the tolerance on lead resistance is very wide. The temperature sensor is a high impedance negative temperature coefficient thermistor 10, but a positive temperature coefficient thermistor or some other temperature sensitive resistive material can be substituted. A first pair of high resistance leads 11 and 12 are connected across the sensor and to a current source 13 such that a constant current is impressed across the thermistor. The magnitude of the current through the sensing element is chosen low enough that ohmic heating of the element by the current results in a temperature rise less than the desired accuracy in the reading. A voltage is developed across the thermistor that is proportional to or indicative of temperature, and a second pair of high resistance leads 14 and 15 are connected across the sensor to transmit this voltage to a high input impedance operational amplifier 16. The voltage representing temperature is fed to the noninverting input of the amplifier which is connected in the voltage follower configuration with the appropriate RC compensation placed between the output and the inverting input. A voltmeter 17 is calibrated to read in degrees of temperature. The utilization circuitry may take other forms, such as an amplifier followed by a shut-off mechanism to turn off the power upon reaching a set temperature.

The low limit of the resistance value of leads 11, 12, 14 and 15 is that the resistance is sufficiently high that they do not absorb energy from the microwave field. That is, the integral of the system impedance along the length of the leads must be small compared to the impedance of the leads, by a factor of about 10:1. The high limit is reached when the impedance of the leads is so high that a voltmeter to read the signal is not realizable. For a microwave oven as presently known, the low limit is about $10^5$ ohms per meter and the high limit is about $10^6$-$10^7$ ohms per meter. The leads are electrically conducting iron oxide magnetic recording tape such as Scotch Brand Magnetic Tape No. 971 sold by Minnesota Mining and Manufacturing Company or its equivalent. Alternatively and preferably, the leads are conductors with the requisite resistance deposited on an insulating substrate, and can be thin film conductors, resistive coatings, or a thin stripe of conducting material on a polyimide or other substrate. One example is stannous oxide, SnO, deposited on a substrate by sputtering or by vapor deposition.

The thermistor chip 10' in FIG. 2 is provided with magnetic tape leads 18–21; one tape length runs across the top of the chip and another runs across the bottom, both bonded to the chip with a thin film of conducting epoxy cement. The thermistor is, for example, YSI 44006 sold by Yellow Spring Instrument Company, Yellow Springs, Ohio, which has a resistance of 10,000 ohms at 25° C. and exhibits a large variation of resistance with temperature. If another thermistor is substituted, the suitable resistance range is about 10,000–20,000 ohms at 25° C.

Scotch Brand Magnetic Tape No. 971 has a coating of contacting and aligned particles of $\gamma$-$Fe_2O_3$, which is structurally like magnetite, and a polyethylene substrate having a melting point of 315° C. The particles are deposited as iron oxide dust intimately mixed with a special lacquer and applied to the tape in a layer between 15 microns and 40 microns thick. A heat treatment is used at 250° C.–300° C. to convert the particles into $\gamma$-$Fe_2O_3$ without changing the shape of the particles. The particles have a mean length of 1 micron and a width of 0.1 microns, and the final mean thickness of the magnetic material is 53 microns. Refer to "Magnetic Materials and Their Applications" by C. Heck, Crane, Russak and Co., Inc., New York, pp. 584–587 (Library of Congress Catalog Card No. 73-77001). Recent tapes with a magnetic layer of $CrO_2$ are not suitable for leads because its Curie temperature is too low (130° C.), and although the $CrO_2$ particles are more conducting than iron oxide, the particles on the tape do not make contact with each other so that the tape is nonconducting to electricity. The advantages of such tape leads for temperature sensing probes are as follows. The tape has a high resistance per unit length of about 1.5 megohms per meter, and is nominally nonperturbing or nearly transparent to electromagnetic radiation in the microwave spectrum. Another outstanding characteristic is its flexibility, and it also has tensile strength and freedom from microphonic noise. It is not necessary to cement together the pair of magnetic tape leads on the smooth side, but if done the adhered together tape has a high capacitance of about $20 \times 10_{-12}$ farads per centimeter. These high resistance, transparent, flexible leads make it possible to construct improved temperature probes; electric potential differences from the sensor may be conveyed without substantially perturbing the electromagnetic waves and without altering the probe. Magnetic tape is sold with a one-quarter inch width but this may be halved or quartered to make one-eighth or one-sixteenth inch leads.

A system for measuring the temperature of food in microwave ovens was built with the YSI high impedance precision thermistor chip and magnetic recording tape leads previously described, which was slit to one-eighth inch width and formed into the four wire arrangement shown. The constant current source was a 112.5 volt battery with a large filter capacitor between the terminals. The read-out amplifier was realized with an RCA CA 3140A operational amplifier connected as a voltage follower; this amplifier has an input impedance of about $10^{12}$ ohms. The voltmeter was a commerical instrument (John Fluke type 8000A). The temperature of water in a small glass beaker was measured with the microwave power on and was within 4° C. of a calibrated run of temperatures. For laboratory experiments, the flexible magnetic tape leads can be brought out of the oven via the normal clearance between the door and the oven shell.

In FIG. 3 is shown an improved microwave oven temperature probe 22 inserted directly into a food load 23, such as a roast, which has a flexible cable 24 that passes through a hole in the metallic oven liner 25 and is connected to the current source and utilization circuitry. The rigid probe and flexible cable both have a dielectric nonmetallic coating or encapsulation that desirably is as thin as permitted by expected mechanical stress in order to minimize both thermal gradient in the probe and perturbation of the microwave field. There is little loss of microwave energy to the ambient because electromagnetic waves do not propagate along the high resistance leads which, if the converse were true, would be the center conductor of a coaxial transmission line. Microwave oven 26 is assumed to be a conventional oven.

One preferred embodiment of temperature sensing probe 22 is made with a T-shaped rigid insulating substrate bar 27, FIG. 4, on which are deposited four resistive conductor stripes 28. A high impedance negative temperature coefficient thermistor chip 29, FIG. 5, is mounted on one end of rigid bar 27 and connections are made between leads 28 and the thermistor as by conducting epoxy. The sensor and substrate bar with leads is now provided with a dielectric encapsulation 30 shaped to have a pointed end for insertion into the food and at the other end to have a stop shoulder 31 and hand hold 32. The coating is made of a material such as a silicone that is nonpower absorbing, is compatible with various foods, and is resistant to oils, salts, and enzymes.

Four-leaded flexible cable 24, FIG. 6, has an elongated flexible insulating substrate 33, and two high resistance conductor stripes 34 are deposited on the upper surface and the lower surface of the substrate. A thin dielectric coating 35 encapsulates the substrate and leads. Cable leads 34 are electrically connected to the deposited leads 28 on bar 27 in the temperature probe in any suitable manner. The substrate in both the cable and probe may be a polyimide and the high resistance deposited leads may be tin oxide.

Another embodiment of the nonperturbing temperature probe in FIG. 7 has the same inside construction as the cable with the thermistor chip laid in the same plane as the substrate. Rigid bar 36 has a rectangular cross section with two deposited leads 37 on the upper surface and two on the lower surface running along the length of the bar, all four extending onto the faces of thermistor 38 to make electrical connection.

In conclusion, the high impedance temperature sensing system measures the temperature of food loads in microwave ovens while the power is on without perturbing the electromagnetic fields. The signal from the sensor is brought out of the oven cavity without causing leakage of energy to the ambient. More accurate temperature readings are achieved.

While the invention has been particularly shown and described with reference to several preferred embodiments thereof, it will be understood by those skilled in the art that various changes in form and details may be made therein without departing from the spirit and scope of the invention.

The invention claimed is:

1. A temperature sensing probe to be inserted into food in a microwave oven in which an electromagnetic field is generated for heating the food comprising; a rigid insulating bar having a high impedance temperature sensor mounted at one end and having four high resistance leads deposited along the length of the bar; a flexible cable with four high resistance leads coupled to the deposited leads on said bar; two of said leads being connected to impress a constant current across said sensor whereby a voltage is developed indicative of temperature and two of said leads being connected across said sensor to transmit the voltage to utilization means; and a dielectric, nonmetallic coating encapsulating said sensor and bar and flexible cable made of a material that is nonabsorbing to microwave energy; the impedance of said sensor and leads being sufficiently high that upon insertion into the electromagnetic field negligible microwave energy is coupled to the probe and cable and the electromagnetic field is minimally perturbed to thereby realize a more accurate temperature measurement without leakage of microwave energy to the ambient.

2. The probe of claim 1 wherein the resistance of each of said leads is on the order of $10^5$ to $10^7$ ohms per meter.

3. The probe of claim 2 wherein said senor is a negative temperature coefficient thermistor with a resistance on the order of 10,000 to 20,000 ohms at 25° C.

* * * * *